United States Patent [19]

Thorogood et al.

[11] Patent Number: 5,049,174

[45] Date of Patent: Sep. 17, 1991

[54] HYBRID MEMBRANE - CRYOGENIC GENERATION OF ARGON CONCURRENTLY WITH NITROGEN

[75] Inventors: Robert M. Thorogood, Macungie, Pa.; Wilman Tsai, Cupertino, Calif.; Robert F. Weimer, Allentown; David H. S. Ying, Macungie, both of Pa.

[73] Assignee: Air Products and Chemicals, Inc., Allentown, Pa.

[21] Appl. No.: 540,028

[22] Filed: Jun. 18, 1990

[51] Int. Cl.[5] ............................................. F25J 3/02
[52] U.S. Cl. .......................................... 62/24; 62/22; 55/16
[58] Field of Search ................... 62/22, 24; 55/16, 158

[56] References Cited

U.S. PATENT DOCUMENTS

| | | | |
|---|---|---|---|
| 4,152,130 | 5/1979 | Theobald | 62/18 |
| 4,230,463 | 10/1980 | Henis et al. | 55/16 |
| 4,595,405 | 6/1986 | Agrawal et al. | 62/18 |
| 4,817,392 | 4/1989 | Agrawal et al. | 62/22 |

Primary Examiner—Ronald C. Capossela
Attorney, Agent, or Firm—Willard Jones, II; William F. Marsh; James C. Simmons

[57] ABSTRACT

The present invention involves an efficient process for separating selected components of a gas stream by integrating a cryogenic separation unit and a membrane separation unit. Two embodiments provide for the concurrent generation of an argon-rich stream in the gas or liquid phase, along with a nitrogen-rich product stream, both being produced from a stream normally comprising oxygen, nitrogen, and argon, e.g., air.

Broadly, the novel system uses a membrane means to preferentially reject the oxygen component from the recycle stream of the cryogenic unit, concurrently accumulating the argon component to allow its separation as an argon-enriched product stream.

20 Claims, 3 Drawing Sheets

HYBRID MEMBRANE - CRYOGENIC GENERATION OF ARGON CONCURRENTLY WITH NITROGEN

TECHNICAL FIELD OF THE INVENTION

The present invention relates to a process for separating the components of a multi-component gas stream by the combination of cryogenic distillation with a membrane process. One specific embodiment involves the generation of a nitrogen-rich stream in the gas or liquid phase, or both, from a stream comprising air, and effecting the concurrent recovery of crude argon.

BACKGROUND OF THE INVENTION

Numerous processes are known for the separation of air by cryogenic distillation into its constituent components; nitrogen, oxygen, and argon, the latter being an inert gas which occurs to the extent of 0.93% by volume in the atmosphere. The use of argon has become increasingly important in various industrial and commercial operations, but is somewhat limited by the relatively high cost of its production in pure form. Among the known methods, in addition to cryogenic separation, are recovery from residual purge gas in the ammonia synthesis process, and by the treatment of atmospheric nitrogen with certain metals to form nitrites, leaving the unreacted argon.

Argon is typically produced at a purity of 95% to 98% from a cryogenic air separation plant with residual oxygen and nitrogen impurities. These impurities are usually removed by deoxygenation with hydrogen as a catalyst and subsequent cryogenic distillation to remove $N_2$ and $H_2$. Recovery of argon from a single-column cryogenic nitrogen plant heretofore has not been effective. Economics have dictated that argon cannot be recovered from cryogenic nitrogen plants, which do not additionally produce high-purity oxygen. Argon is present as the minor component in air and has a volatility between oxygen and nitrogen and is thus very difficult to produce without the simultaneous separation of pure oxygen.

Presently, argon is not recovered from cryogenic air separation plants adapted for nitrogen production, e.g., those that produce nitrogen for enhanced oil recovery applications, or gas inerting, or electronics processing. Today argon is primarily seen as a by-product of large scale plants.

It would be most useful to be able to modify a standard, single-column nitrogen generator process, so that it would foster the co-production of crude argon, and with only modest added power consumption. Existing technology, as mentioned, can effectively purify crude argon for commercial uses.

High purity gaseous nitrogen is produced directly by well-known cryogenic separation methods. Liquid nitrogen is typically produced by initially producing gaseous nitrogen in a cryogenic air separation unit, (ASU) and subsequently treating the gaseous nitrogen in a liquefier. Modified forms of cryogenic ASU's have been developed to directly produce liquid nitrogen. See U.S. Pat. No. 4,152,130 which discloses a method of producing liquid oxygen and/or liquid nitrogen.

The production of medium purity nitrogen or oxygen by non-cryogenic air separation processes is also achieved by using absorption, adsorption. and membrane-based processes, see U.S. Pat. No. 4,230,463.

Incorporating one or more membrane units into a cryogenic cycle at some point, or points, can improve the efficiency and economics of the system. Specifically, incorporating a membrane unit allows a given cryogenic cycle to be operated efficiently at conditions that might be inefficient when operated on a stand-alone basis. Consequently, cryogenic cycles that were considered inefficient in the past may, when properly coupled with a membrane system, yield superior and feasible processes.

One known process involves separating components of a gas stream by integrating a cryogenic separation unit and a membrane separation unit. U.S. Pat. No. 4,595,405 teaches generation of one or more nitrogen-rich streams in the gas or liquid stage, or both from a feed stream comprising air. The patent does not suggest how an air feed stream could be economically treated to produce crude argon by integrating a cryogenic process system with a membrane separation unit, as well as producing nitrogen.

It is therefore, an object of the present invention to permit the recovery of argon from single-column cryogenic nitrogen plants which do not also produce high-purity oxygen. It is another object to make a useful application of the known fact that a build-up of argon concentration relative to nitrogen and oxygen occurs in the middle portion of a high-pressure cryogenic nitrogen production column.

A still further object of the invention is to provide means to modify a single column nitrogen process cycle so that it will utilize argon build-up therein and allow co-production of useful volumes of crude argon. These and other objects, aspects, and features of the invention will become apparent to one skilled in the art from the specification, claims and drawings appended hereto.

BRIEF SUMMARY OF THE INVENTION

The present invention provides for an effective process for the production of liquid and/or gaseous argon from a feed stream comprising oxygen, nitrogen, and argon, such as air. This process comprises treating the feed stream in a cryogenic processing unit, which normally focuses on nitrogen production, by withdrawing from the middle portion of a high-pressure cryogenic distillation column with the primary purpose of separating nitrogen, a small stream of argon-enriched liquid which is then fed to the upper end of a high-pressure side distillation column (functioning for rejection of nitrogen) to obtain a crude argon product stream. Argon which would normally be lost from the process with the waste oxygen is at least partly retained by permeating the waste stream through a highly oxygen-selective membrane. The membrane reject stream (argon-enriched) is recycled to the high-pressure cryogenic main column.

The key to the current process of simultaneous production of product nitrogen and crude argon in a nitrogen generator is the provision of membrane means with a sufficient argon-oxygen selectivity. This effects rejection of oxygen from a waste oxygen recycle loop, allowing argon to accumulate in the recycle flow. A side distillation column draws the argon-enriched liquid from the main column and produces argon in a concentration of from 50% to 85%, in an argon/oxygen mixture, which can be further concentrated using a second membrane, or other deoxygenation process, to yield crude argon (95% Ar).

The crude argon stream is a candidate for further de-oxygenation and distillation to produce a saleable argon product. With the use of a high selectivity oxygen membrane, such as may be achieved using a facilitated transport membrane, the energy cost for the hybrid process to simultaneously produce both argon and pure nitrogen is similar to that for a cryogenic process to produce nitrogen alone.

DETAILED DESCRIPTION OF THE INVENTION

The present invention provides for an efficient process for separating components of a gas stream containing three or more components by the integration of one or more membrane units with a suitable cryogenic separation unit.

Figure 2:
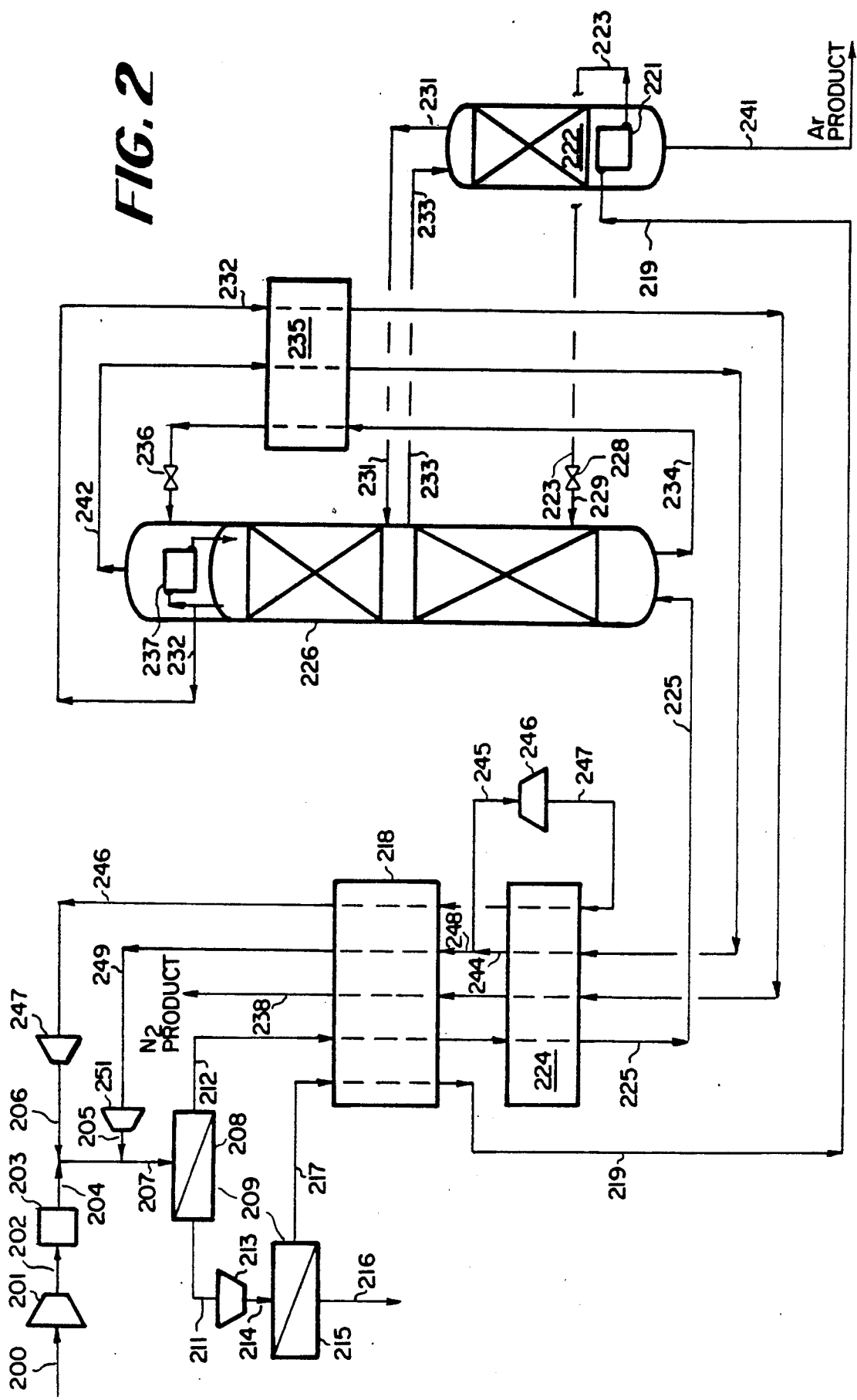
FIG. 2 is a specific flow diagram of one particular embodiment of the nitrogen and argon co-production process of the present invention.
Figure 3:
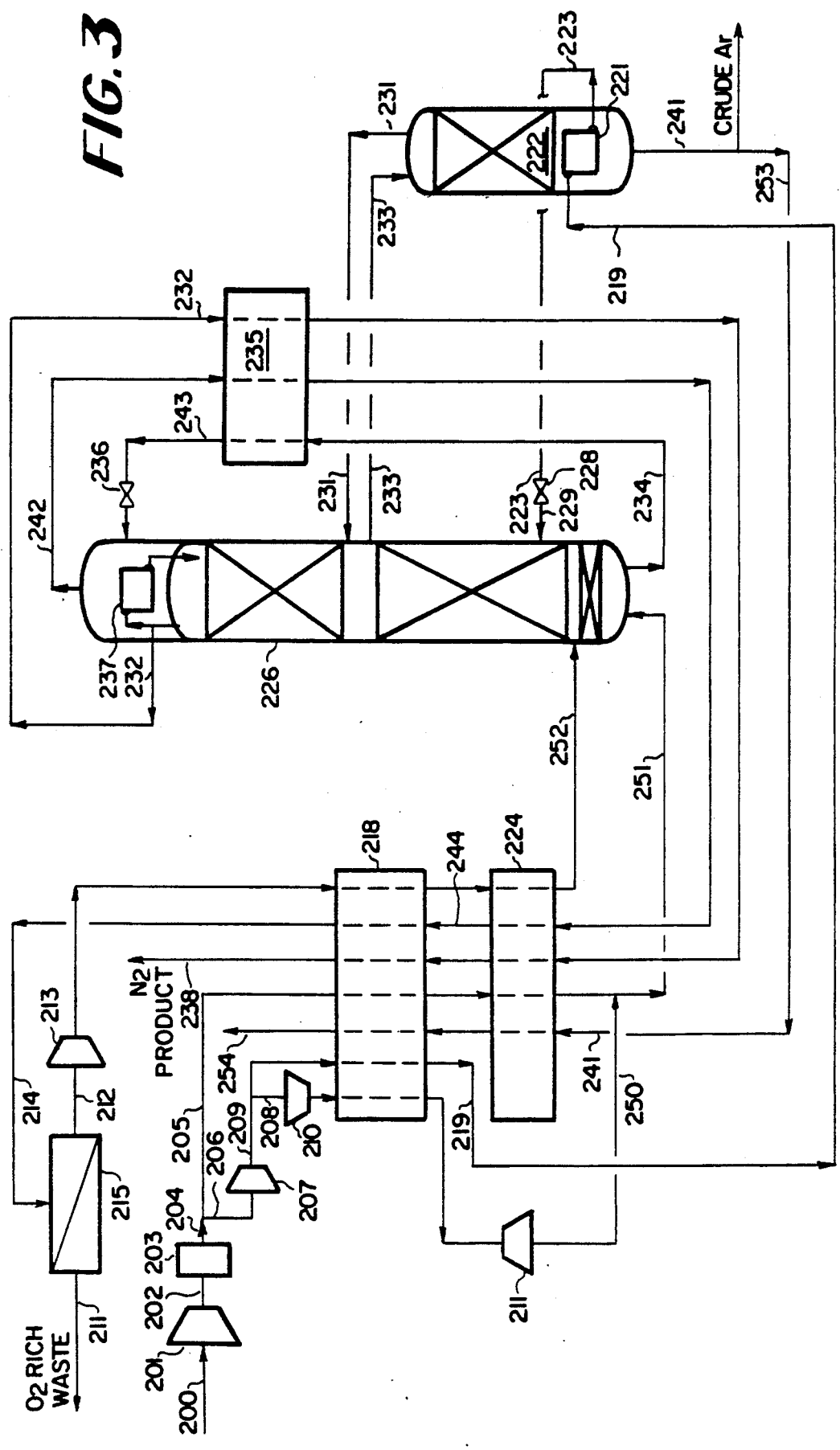
FIG. 3 is a specific flow diagram of another embodiment of the nitrogen and argon co-production process of the present invention.

The process as shown in FIGS. 2 and 3 shows one or more process streams leaving the cryogenic unit and being fed to one or two membrane units. The number of streams taken from the cryogenic unit, as well as the composition, pressure, and temperature of the streams is dependent upon the specific cryogenic cycle used, and is adjusted so that the performance of the total plant is at its optimal point consistent with co-production of nitrogen and crude argon products.

The mixed gas stream is initially fed to a main cryogenic processing unit where it undergoes cryogenic treatment. The specific cryogenic treatment will depend upon the composition of the gas stream being treated and the end product desired, but in any case will involve cooling and at least partial removal of one component of the gas stream. At least a portion; i.e., at least about 5% based on initial feed, of the treated gas stream is removed continuously from the cryogenic separation unit and fed to a membrane separation unit. The amount withdrawn at this point is dependent upon equipment size and capacity, flow rates, desired end product purity, and optimization conditions. The withdrawn portion of the gas stream is partially separated in the membrane unit thereby forming a permeate stream and a reject stream. The type of membrane used is dependent upon its selectivity for the components which are to be separated and, hence, may vary with the make-up of the feed.

The feed to the membrane is partially separated to form a permeate stream and a reject stream. Depending upon the product desired, at least one of the streams from the membrane unit is returned to the cryogenic separation unit for further treatment. i.e. cooling and separation, to form a purified gaseous and/or liquid product.

A general description of the state-of-the-art process for nitrogen production can be had by reference to the drawing.

Figure 1:
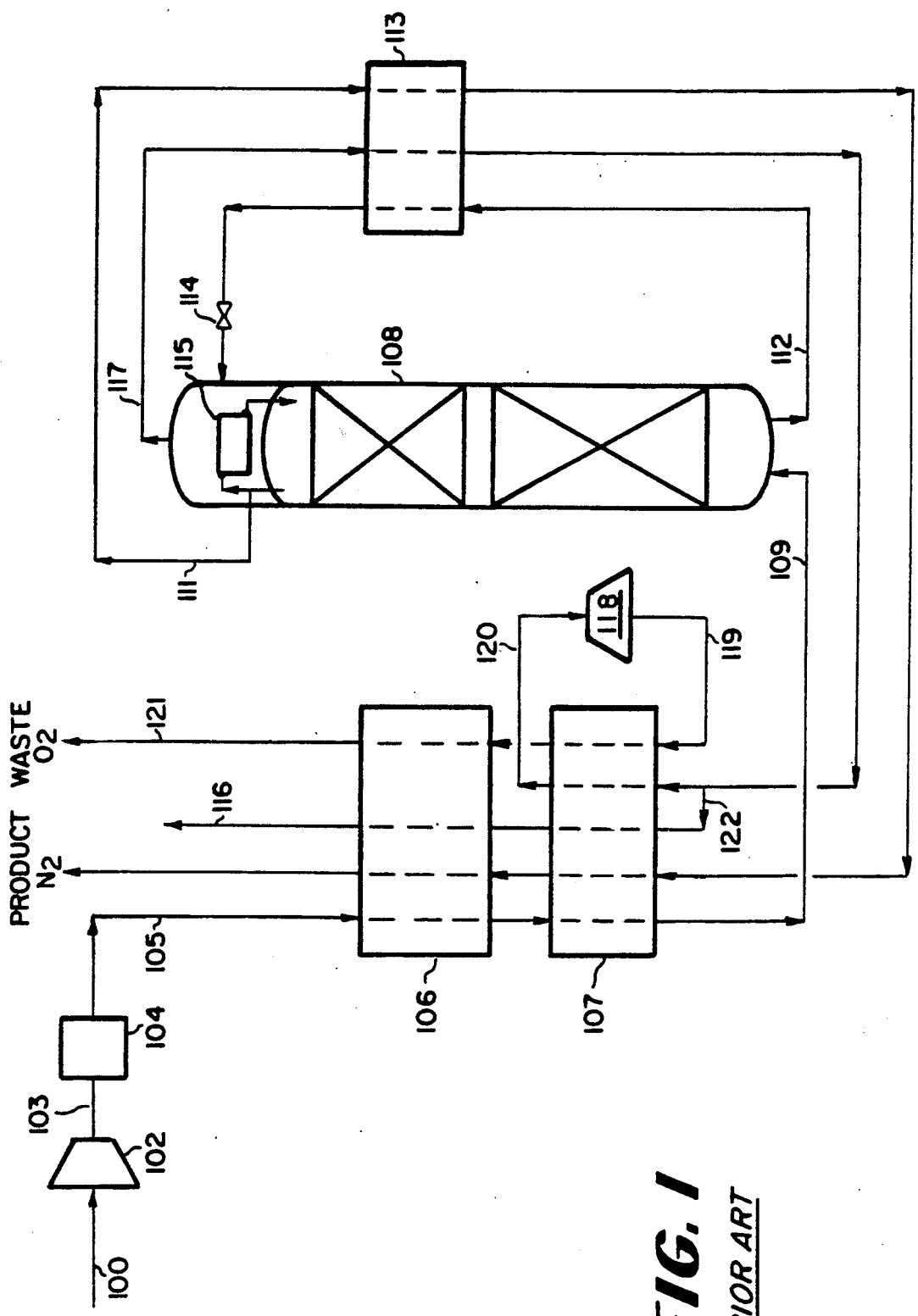
FIG. 1 is a general schematic flow diagram of a state-of-the-art process for generation of gaseous and/or liquid nitrogen.

As shown in FIG. 1, an ambient air stream 100 is compressed by compressor 102 to provide stream 103 which is subsequently passed through a molecular sieve clean-up unit 104 to remove carbon dioxide and water. The entire purified stream 105 is cooled in sequential exchangers 106 and 107 and fed to the bottom of distillation column 108. Distillation column 108 splits the single feed stream 109 into a high-purity nitrogen overhead stream 111 and a nitrogen-depleted underflow stream 112. Stream 112 is subcooled in a third heat exchanger 113 and reduced in pressure through valve 114 to provide a source of refrigeration for reflux condenser 115 located at the top of distillation column 108.

The pure nitrogen stream 111 is warmed sequentially in heat exchangers 113, 107 and 106, becoming the primary nitrogen product stream 116. The vaporized, nitrogen-depleted overhead stream 117 is also warmed in heat exchangers 113 and 107, prior to the warmed stream 120 being expanded in expander 118 to provide refrigeration for the process. The expander outlet stream 119 is then rewarmed in heat exchangers 107 and 106, and is vented at atmospheric pressure as a waste oxygen stream 121.

A part of stream 117 which is not required for refrigeration purposes may be removed as stream 122 which is then warmed sequentially through heat exchangers 107 and 106 and leaves the process as an intermediate pressure waste oxygen steam 123. According to the invention, an integrated cryogenic-membrane process was configured to produce gaseous nitrogen as the main product and an argon-rich liquid or vapor as a by-product. This process is illustrated by FIG. 2 and FIG. 3.

A first embodiment of the present process is illustrated by FIG. 2. This embodiment uses a two-stage membrane separation system which is technically feasible, using membranes which are manufactured today. In this embodiment, an ambient air stream 200 is compressed by compressor 201 to provide stream 202 which is subsequently passed through a molecular sieve clean-up unit 203 to remove carbon dioxide and water. The purified stream 204 is combined with $O_2$-rich recycle streams 205 and 206 and the combined stream 207, is fed to the first stage 208 of a two-stage membrane gas separation system 209, where it is split into a relatively oxygen-rich permeate stream 211, and a relatively nitrogen-rich and argon-rich "reject" stream 212.

The permeate stream 211 is recompressed by compressor 213 and fed via line 214 to a second membrane stage 215 where it is separated into an oxygen-rich vent stream 216 and a relatively nitrogen-rich and argon-rich recycle stream 217. Stream 217 is cooled in heat exchanger 218 providing stream 219 which is subsequently condensed in reboiler/condenser 221 located at the bottom of side arm column 222 providing reboiler duty for column 222 and yielding a condensed liquid side stream 223.

The major stream $N_2$-rich 212 from the membrane gas separation system 209 is cooled in heat exchangers 218 and 224 providing stream 225, which is fed to the bottom of main distillation column 226. Liquid stream 223 from side column 222 is reduced in pressure through valve 228, and the resulting stream 229 is also fed at, or near, the bottom of distillation column 226. Distillation column 226 is concurrently fed by the overhead vapor stream 231 from side-arm column 222.

Column 226 separates the combined feeds into a high-purity nitrogen vapor overhead stream 232; a small, relatively argon-rich liquid side stream 233, and an oxygen-rich liquid underflow stream 234. Stream 234 is subcooled in heat exchanger 235 and reduced in pressure through valve 236 to provide a source of refrigeration for reflux condenser 237 located at the top of distillation column 226. The pure nitrogen overhead stream 232 is warmed in heat exchangers 235, 224, and 218, becoming the nitrogen product stream 238.

One of the unique features of the disclosed process, a small, relatively argon-rich liquid side stream 233 is withdrawn from distillation column 226, and fed to the top of the side distillation column 222. Distillation column 222 serves to remove nitrogen from this stream, producing a bottoms liquid stream 241 which is an argon/oxygen mixture containing more than 80% argon and substantially devoid of nitrogen. Overhead vapor stream 231 from side column 222 is returned to main column 226. The bottoms liquid stream 241 of column 222 is withdrawn as crude argon product.

Overhead vapor stream 242, resulting from the vaporization of stream 243 in the reboiler-condenser 237 at the top of distillation column 226, is warmed in heat exchangers 235 and 224 to form partially re-warmed stream 244. A portion 245 of stream 244 is fed to expander 246, which provides the refrigeration needed for the cryogenic portion of the process. The expanded stream 247, is warmed in heat exchangers 224 and 218, forming stream 246, which is subsequently compressed by compressor 247 to form recycle stream 206. The unexpanded stream 248 is warmed only in heat exchanger 218 to form stream 249, which is subsequently compressed by compressor 251 to form companion recycle stream 205.

The membrane characteristics adaptable to the present invention are based on a surface treated polymeric membrane (poly[trimethyl silylpropyne]) developed and tested by Air Products and Chemicals, Inc., which has an oxygen to argon selectivity ratio of 2.63. This low selectivity causes about 80% of the total argon feed to the membrane 209 (stream 207) to remain in the reject stream 212 of the first stage. Added argon recovery is achieved by recompressing the first stage permeate stream 211 and feeding it to the second stage membrane 215. This membrane system recovers 33% of the argon and 90% of the nitrogen in the feed (stream 200), and produces a waste stream rich in oxygen (90% oxygen), which is purged from the system via line 216. In the next embodiment, the single-stage membrane separates only the recycle stream, rather than a combined feed air and recycle flow.

A second embodiment of the invention is illustrated by FIG. 3. This version depends upon the use of a single-stage membrane which is highly selective for oxygen relative to argon and nitrogen.

In this embodiment, ambient air stream 200 is compressed by compressor 201 to provide stream 202 which is subsequently passed through a molecular sieve cleanup unit 203 to remove carbon dioxide and water. The purified stream 204 is split into a larger stream 205, and a smaller stream 206, with a mass flow ratio of about 7:3, respectively. The smaller stream 206 is further compressed by compressor 207, subsequently split into a larger stream 208 and a smaller stream 209, with a mass ratio of about 4:1, respectively. Stream 208 is further compressed by compressor 210, cooled in heat exchanger 218, and expanded in expander 211, to provide refrigeration for the cycle. Stream 209 is also cooled in heat exchanger 218, providing stream 219 which is subsequently condensed in reboiler/condenser 221 located at the bottom of side arm column 222, providing reboiler duty for column 222, and yielding a condensed liquid side stream 223.

The major air stream 205 is cooled in heat exchangers 218 and 224 and is combined with discharge stream 250, from the expander 211, to form stream 251 which is fed to the bottom of distillation column 226. Side column liquid stream 223 is reduced in pressure through valve 228 to form stream 229 which is fed at or near the bottom of column 226. Distillation column 226 is also fed by the overhead vapor stream 231 from column 222. Distillation column 226 separates the combined feeds into a high-purity nitrogen vapor overhead stream 232; a small, relatively argon-rich liquid side stream 233; and an oxygen-rich liquid bottoms stream 234. Stream 234 is subcooled in heat exchanger 235, and reduced in pressure through valve 236 to provide a source of refrigeration for reflux condenser 237 located at the top of distillation column 226. The essentially pure nitrogen stream 232 is warmed in heat exchangers 235, 224, and 218 becoming the nitrogen product stream 238.

By one of the unique features of the present invention, a small, relatively argon-rich liquid side stream 233 is withdrawn from main distillation column 226 and fed to the top of side distillation column 222. Distillation column 222 serves to remove nitrogen from this stream, producing a bottoms liquid stream 241 which is an argon/oxygen mixture, containing more than 70% argon, and substantially devoid of nitrogen. Overhead vapor 231 from distillation column 222 is returned to column 226.

The liquid bottom stream 241 is warmed in heat exchangers 224 and 218, forming crude argon product stream 254. Alternatively, stream 241 may be withdrawn directly as a liquid product due to its small flow rate.

Overhead stream 242, resulting from the vaporization of stream 243 in the reboiler-condenser 237 at the top of distillation column 226, is warmed in heat exchangers 235, 224, and 218, providing stream 214 which is fed to membrane separation system 215. Membrane separation system 215 separates stream 214 into an oxygen-rich permeate 211, and a relatively argon and nitrogen-rich reject stream 212. Stream 211 is vented at atmospheric pressure as a waste oxygen-rich stream. Stream 212 is compressed by compressor 213 and recycled to distillation column 226, a few stages above the bottom, after having been cooled in heat exchangers 218 and 224, via line 252.

The crude argon stream 254 may be subsequently purified, for example, by membrane separation, cryogenic distillation and/or catalytic de-oxo systems.

All or part of the recycle compression (compressor 213) may be supplied upstream of membrane separator 215 resulting in increased Ar and $N_2$ recovery.

Side distillation column 222 could be operated at a lower pressure than column 226, in which case the overhead $N_2$ stream 231 would have to be recompressed or added to recycle stream 242.

Table I compares the process of FIG. 1 with the new processes of FIGS. 2 and 3. All process calculations were done using the attached "Standards for Hybrid Cycle Work" (Table II) to ensure a fair comparison. The processes of FIG. 3 having a membrane separation system were calculated assuming a single-stage high-oxygen-selectivity membrane (selectivity of $O_2/Ar=53$ and $O_2/N_2=100$).

The simulated cases in Table I may be described as follows:

The first column is the optimized present practice, but without a membrane and without argon production, as depicted by FIG. 1.

Case A is the first embodiment of the new process, using membranes with currently available selectivities for oxygen and argon relative to nitrogen. This case corresponds to FIG. 2, and illustrates the technical feasibility of the flow sheet to produce crude argon having >80% purity. Incremental power consumption is required.

Case B is an alternate embodiment of the process (FIG. 3) employing a highly selective membrane such as may be obtained with an active transport membrane. Given the existence of such a membrane, it is preferable to put the membrane on the recycle stream 214 only. It shows that 29% argon recovery may be obtained, with no increase in power relative to production of nitrogen alone, by the addition of the sidearm column. This is also true when the oxygen concentration stream 212 of FIG. 3 is maintained between 13% and 16%.

Case C is the same as case B, except that argon recovery has been increased to 46%, at the expense of increased power and reduced argon purity, by increasing the oxygen content and flow.

Case D shows the effect of increasing the membrane feed pressure to 80 psia. This improves argon recovery and crude argon purity substantially relative to case B, while not exceeding the power required for the optimized base case of FIG. 1. Membrane area is also reduced.

Case E shows the effect of increasing the membrane feed pressure to essentially that of the distillation column pressure. Argon recovery and purity are increased and membrane area is very much reduced at the expense of increased power consumption. Case E also produces a "waste oxygen" stream 211 containing 89% oxygen.

The present invention has been described with reference to some specific embodiments thereof. These embodiments should not be considered a limitation of the scope of the present invention. The scope of the present invention is ascertained by the following claims.

TABLE I

Argon Separation Process Cycle Comparison

|  | Present Practice (FIG. 1) | New Process (FIG. 2 and 3) | | | | |
| --- | --- | --- | --- | --- | --- | --- |
|  |  | Case A | Case B | Case C | Case D | Case E |
| Nitrogen Product, moles/100 moles dry air feed: | 47.9 | 72.4 | 71.4 | 73.9 | 74.3 | 75.9 |
| Crude Argon Product, moles/100 moles dry air feed: | 0 | 0.36 | 0.37 | 0.60 | 0.46 | 0.56 |
| $O_2$ in $N_2$ Product, ppm | 5 | 5 | 5 | 5 | 5 | 5 |
| $N_2$ Product Press., psia | 115 | 115 | 115 | 115 | 115 | 115 |
| Ar in crude Ar Product, (stream 241,), % | — | 83.2 | 71.8 | 70.7 | 78.6 | 83.1 |
| Moles contained Ar in Ar product, moles/100 mole Ar in air feed: | 0 | 32 | 29 | 46 | 39 | 50 |
| Pressure of expander inlet stream, psia | 73 | 126 | 121 | 121 | 121 | 121 |
| Flow rate of stream, 212 moles/100 moles dry air feed: | 0 | 171 | 70 | 85 | 78 | 85 |
| $O_2$ concentration in stream 212 | — | 22.4 | 14.3 | 19.4 | 12.8 | 11.8 |
| Membrane feed pressure, psia | — | 126 | 57 | 55 | 80 | 120 |
| Power, Kwh/100 SCF $N_2$ Product | 0.533 | 0.791 | 0.530 | 0.541 | 0.532 | 0.541 |
| No. of membrane stages | — | 2 | 1 | 1 | 1 | 1 |
| Relative membrane area per 100 moles dry air feed (assuming same permeance for $N_2$ for all cases): | 0 | 2288 | 1814 | 1223 | 700 | 255 |
| Membrane selectivity |  |  |  |  |  |  |
| $O_2/N_2$ | — | 5.5 | 100.0 | 100.0 | 100.0 | 100.0 |
| $O_2/Ar$ | — | 2.9 | 52.8 | 52.8 | 52.8 | 52.8 |

We claim:

1. A process for the concurrent production of gaseous and/or liquid nitrogen and crude argon from a feed gas stream comprising oxygen, nitrogen, and argon, said process comprising providing an added degree of freedom for adjusting the process parameters by:

(a) feeding said gas stream to a hybrid cryogenic air separation unit comprising a main and a secondary cryogenic unit and a membrane system to process said gas stream and yield a nitrogen product and crude argon product;

(b) withdrawing at least a portion of the treated gas which is argon-enriched from the main cryogenic distillation unit;

(c) feeding the argon-rich portion to the secondary distillation unit wherein said stream is separated to form a nitrogen-enriched distillation overhead vapor stream which is returned to the main cryogenic separation unit, and a product crude argon and oxygen bottoms liquid stream which is removed from the hybrid separation system for possible further purification;

(d) withdrawing a substantially pure gaseous nitrogen stream from the upper section of said main cryogenic distillation unit as product;

(e) compressing a second gaseous oxygen-enriched stream from the upper reboiler section of said main cryogenic distillation unit combining with the fresh compressed feed stream, and feeding the resulting stream to a first membrane unit, wherein said stream is split into a relatively argon and nitrogen-rich reject stream which is recycled after cooling to the bottom of said primary distillation unit, and a relatively oxygen-rich permeate stream;

(f) compressing said oxygen-rich permeate stream and feeding same to a second membrane unit wherein said stream is split into an oxygen-rich vent stream, and a relatively argon and nitrogen-rich stream which is recycled to the lower section of said distillation zone for condensation in the reboiler/condenser component thereof;

(g) withdrawing said condensed stream from said reboiler/condenser component of said secondary cryogenic unit and recycling same to the bottom section of said main cryogenic unit; and (h) providing refrigeration for the operation of the cryogenic process by work expansion of a process gas stream within the cryogenic system.

2. The process of claim 1 wherein the feed gas stream is air.

3. The process in accordance with claim 1, wherein at least a portion of said nitrogen-enriched vapor stream is returned to the main cryogenic zone for further processing.

4. The process of claim 1 wherein the feed gas stream is compressed air and is passed through a water and carbon dioxide removal zone prior to being passed to the separation process.

5. The process in accordance with claim 4 wherein said removal zone contains one or more molecular sieve beds.

6. The process in accordance with claim 1 wherein said oxygen-rich recycle stream is passed through a compressor prior to being passed to said first membrane unit.

7. The process in accordance with claim 1 wherein the total argon recovery from the hybrid system based on the feed stream, is at least 30 volume percent.

8. The process in accordance with claim 1 wherein the nitrogen product stream has a purity of at least 99.9 percent.

9. The process of claim 1 wherein the overhead nitrogen-enriched vapor stream of said secondary unit is recycled to the middle section of said main cryogenic unit.

10. A process for the concurrent production of gaseous and/or liquid nitrogen and crude argon from a feed gas stream comprising oxygen, nitrogen, and argon, said process comprising (a) feeding at least a major percentage of said feed gas directly to the bottom section of said main cryogenic distillation unit to produce a high-purity nitrogen vapor stream, an oxygen-rich vapor stream for internal processing, and an argon-rich liquid side stream;

(b) feeding the argon-rich side stream to the upper section of a second cryogenic distillation unit, wherein said stream is separated to form a nitrogen-enriched vapor stream that is returned to the main cryogenic separation unit, and a crude argon and oxygen bottoms liquid, which is removed directly from the separation system for added processing to argon product;

(c) withdrawing said high-purity nitrogen vapor stream as a product;

(d) passing said second oxygen-rich vapor stream to the membrane zone wherein it is split into a relatively oxygen-rich permeate stream which is vented, and into a relatively argon and nitrogen rich reject stream; and (e) compressing and cooling said argon-rich and nitrogen-rich stream and recycling the compressed stream directly to the bottom section of said main cryogenic separation unit; and (f) providing refrigeration for the operation of the cryogenic process unit by work expansion of a compressed process gas stream within the cryogenic process unit.

11. The process of claim 10 wherein at least a part of the crude argon/oxygen bottom stream from the secondary unit is passed firstly to a heat exchange means for warming to gaseous form before withdrawal from the system for added purification.

12. The process in accordance with claim 10 wherein at least a portion of the nitrogen-rich reject stream is returned to the main cryogenic separation unit for further processing.

13. The process in accordance with claim 10 wherein said oxygen-rich stream is first passed through a compressor before its separation in the membrane units and return of the reject to the main cryogenic separation unit.

14. The process in accordance with claim 10 wherein the feed gas stream is compressed air and is passed through a water and carbon dioxide removal zone prior to being passed to the main cryogenic separation unit.

15. The process in accordance with claim 14 wherein said removal zone contains one or more molecular sieve beds.

16. The process in accordance with claim 10 wherein said oxygen-rich overhead vapor stream is warmed appreciably before entering the membrane separation unit.

17. The process of claim 10 wherein the argon-enriched stream as withdrawn from the secondary separation unit has an argon concentration in the range of about 70 to about 98 volume percent.

18. The process of claim 10 wherein a condensed liquid stream is withdrawn from the reboiler condenser component of said secondary cryogenic unit and passed to the lower portion of said main cryogenic unit.

19. The process of claim 10 wherein the overhead nitrogen-enriched vapor stream of said secondary cryogenic distillation column is returned to the middle section of said main cryogenic unit.

20. A hybrid membrane and cryogenic air separation process for the concurrent production of gaseous an/or liquid nitrogen and crude argon comprising: preferentially rejecting oxygen by means of a membrane from an oxygen waste stream of a main cryogenic distillation system which produces nitrogen product thereby producing an oxygen reject stream and a nitrogen and argon recycle stream, said oxygen waste stream comprising oxygen, nitrogen and argon and having oxygen as the major component; recycling said nitrogen and argon recycle stream back to the main cryogenic distillation system; and removing an argon-enriched nitrogen side stream from the main cryogenic distillation system and feeding the removed side stream to a cryogenic stripping column wherein crude argon is produced at the bottom.

* * * * *